Figure 1:
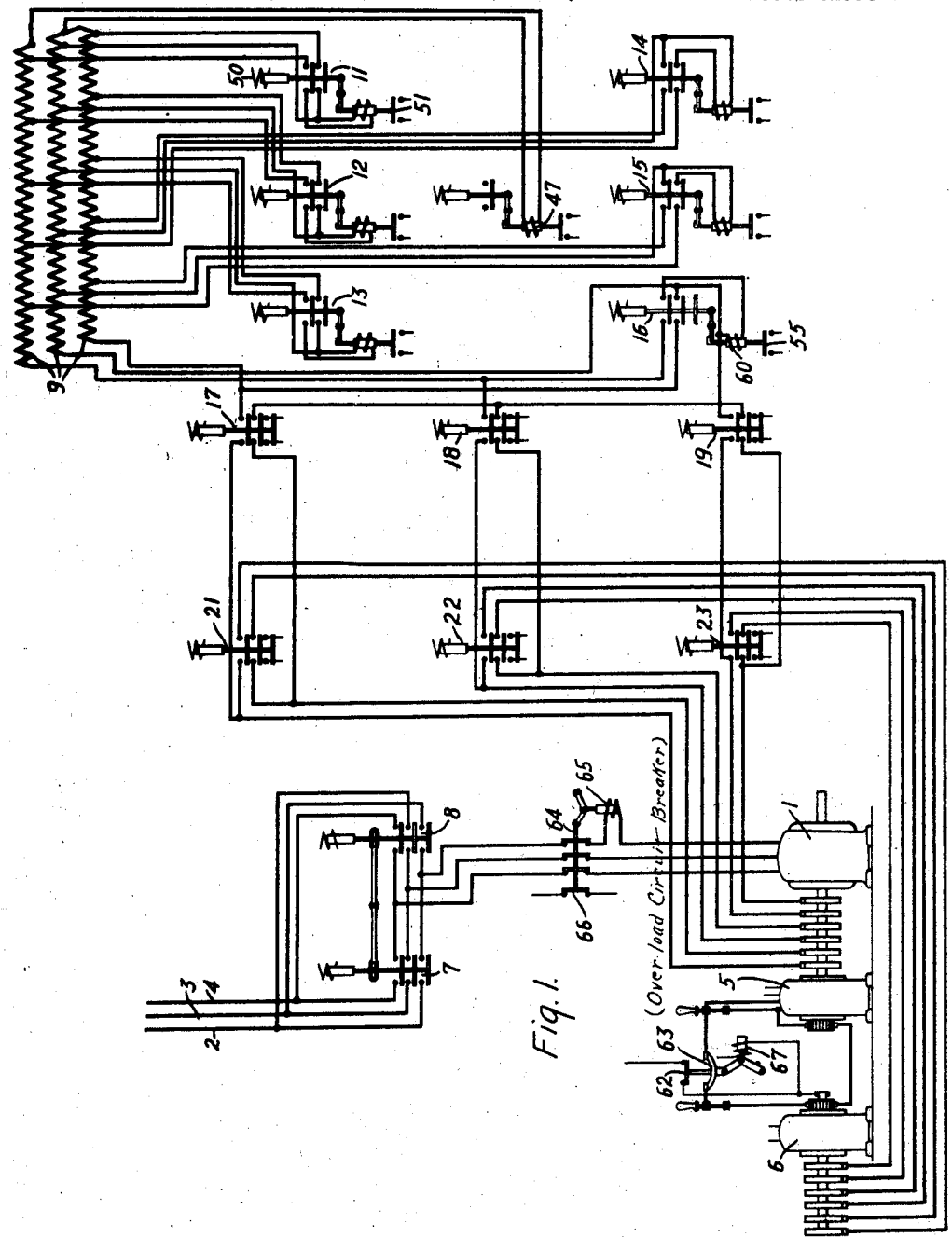

Feb. 12, 1924.　　　　　　　　　　　　　　　　　　1,483,446
G. W. HUEY
ELECTRICAL SYSTEM
Filed June 8, 1917　　　　3 Sheets-Sheet 3

WITNESSES:　　　　　　　　　　　　　　　　　　INVENTOR
Fred. A. Lind.　　　　　　　　　　　　　　　　George W. Huey
Fred H. Miller　　　　　　　　　　　　　BY
　　　　　　　　　　　　　　　　　　　　Wesley G. Carr
　　　　　　　　　　　　　　　　　　　　　　ATTORNEY Patented Feb. 12, 1924.

1,483,446

UNITED STATES PATENT OFFICE.

GEORGE W. HUEY, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRICAL SYSTEM.

Application filed June 8, 1917. Serial No. 173,444.

*To all whom it may concern:*

Be it known that I, GEORGE W. HUEY, a citizen of the United States, and a resident of Wilkinsburg, in the county of Allegheny and State of Pennsylvania, have invented a new and useful Improvement in Electrical Systems, of which the following is a specification.

My invention relates to electrical systems such as are employed for operating rolling mills and similar machines.

One object of my invention is to provide a simple and efficient arrangement for controlling the speed of electric motors.

A second object of my invention is to provide an arrangement for effecting changes in the connections of the windings of dynamo-electric machines in a predetermined sequence, whereby the circuits of the windings of the dynamo-electric machines may be opened without the occurrence of abnormal conditions.

My invention comprises a main alternating-current motor for driving a rolling mill or other machine that is operated at varying speeds. A direct-current motor, which is mechanically connected to the alternating-current motor, is supplied with energy at desired times from a rotary converter, the latter being supplied with energy from the secondary winding of the alternating-current motor. The amount of energy supplied to the direct-current motor by the rotary converter is controlled by varying the field excitation of the direct-current motor.

The system comprises, also, means for controlling the connection of the secondary winding of the alternating-current motor to the slip rings of the rotary converter. These connections are effected automatically when a master switch is actuated to its running position if the motor is operating under light load. Means are provided, however, for preventing the establishment of the connections between the dynamo-electric machines in case the current traversing the circuits of the alternating-current motor exceeds a predetermined value.

By means of the arrangement described above, the system operates efficiently at various speeds and under varying operating conditions. The energy ordinarily dissipated in the form of heat is translated into mechanical energy for performing useful work. The operation of the controlling means to cause energy to be supplied to the direct-current motor decreases the speed of the mechanically connected motors by reason of the fact that a counter-electromotive force is supplied to the secondary winding of the alternating-current motor by the rotary converter.

To bring the motors to rest, the secondary winding of the alternating-current motor remains in circuit with the rotary converter until after the master switch has effected the opening of the primary circuit. The primary circuit is thus opened while the secondary circuit is short-circuited by the windings of the rotary converter and the direct-current motor. The opening of the secondary circuit after the primary circuit has been opened permits the discharge of the energy stored in the primary member without danger of destroying the insulation of the motor.

Figure 2:
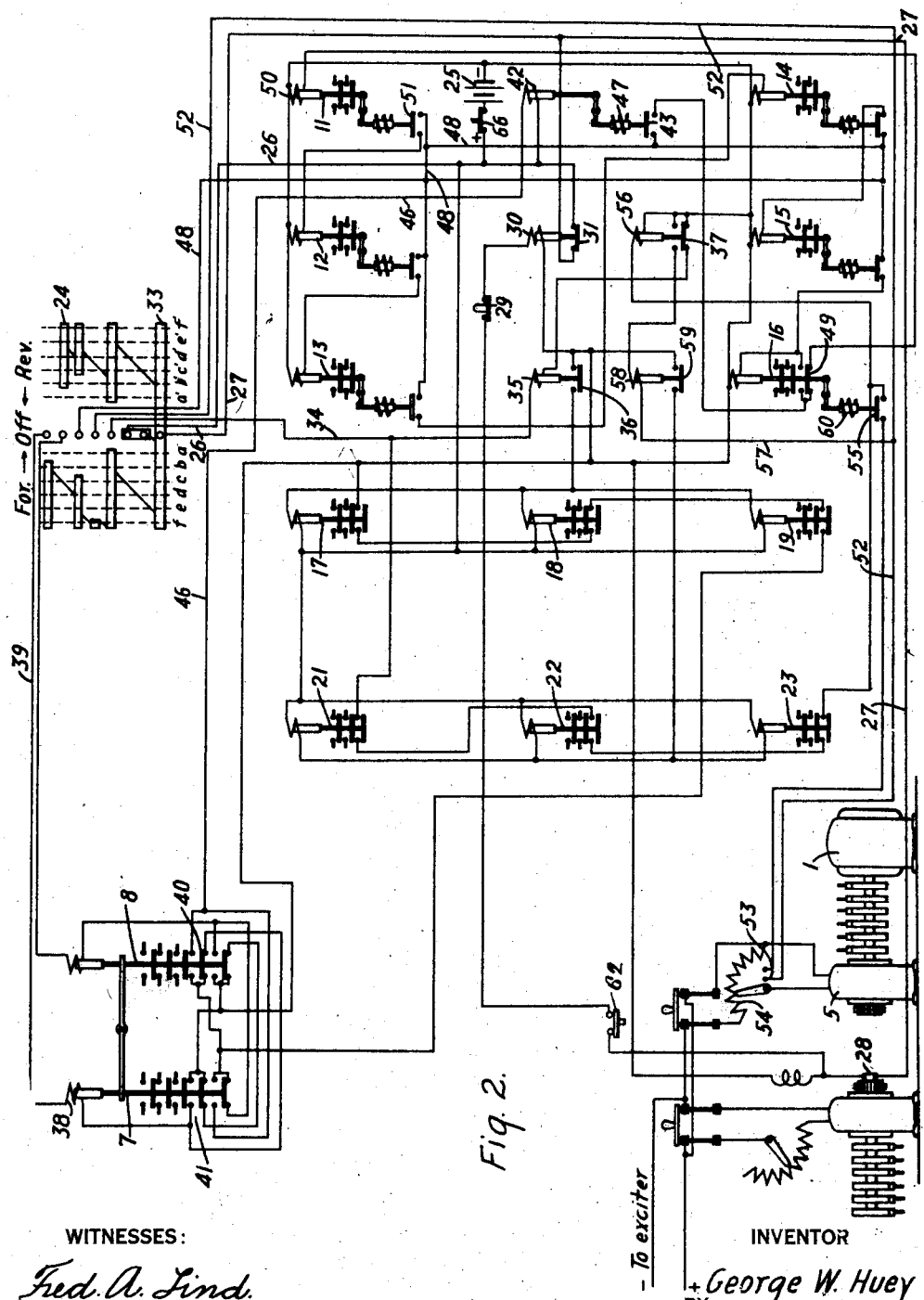
Figures 3, 4:
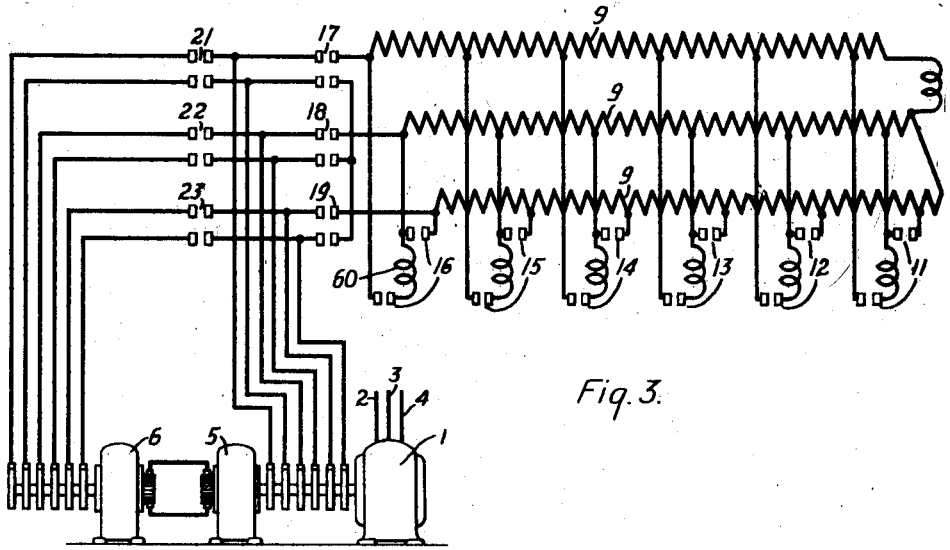

The details of my invention will be described in connection with the accompanying drawings in which Fig. 1 is a diagrammatic view of the main circuits and certain apparatus of an electrical system arranged in accordance with my invention. Fig. 2 is a diagrammatic view of the control circuits for the system illustrated in Fig. 1. Fig. 3 is a schematic arrangement of the main circuits of the system shown in Fig. 1. Fig. 4 is a chart indicating the sequence of operation of the several controlling switches. Similar numerals are employed throughout the specification and drawings to designate corresponding parts.

Referring particularly to Fig. 1, in which the main circuits of a system arranged in accordance with my invention are diagrammatically illustrated, an alternating-current motor 1, which may be employed to drive rolling mills or similar machines, is supplied with energy from line conductors 2, 3 and 4 which may be connected to any suitable source of alternating current. A direct-current motor 5 is mechanically connected to the motor 1. A rotary converter 6 is provided with communicating brushes that are connected to the brushes of the direct-current motor 5 and with slip rings that are adapted to be connected to the slip rings of the alternating-current motor 1.

The primary circuits of the main motor 1 are controlled by reversing switches 7 and 8. Three resistors 9, which are adapted to be connected in circuit with the respective phases of the secondary winding of the motor 1, are controlled by a series of progressively actuated switches 11, 12, 13, 14, 15 and 16.

The connections of the secondary winding of the motor 1 to the resistors 9 are controlled by switches 17, 18 and 19. Switches 21, 22 and 23 control the connections between the secondary winding of the motor 1 and the slip rings of the rotary converter 6.

Reference may now be had to Fig. 2, in which the control circuits for the various switching devices illustrated in Fig. 1 are shown in operative relation to the several devices controlled by them. A master switch 24, or controller, effects the closing of certain of the switches in a predetermined order to successively effect the connection of the secondary winding to the starting resistors, the connection of the primary winding to the source of energy, the shunting of the resistors and the connection of the secondary winding of the motor to the alternating-current side of the rotary converter.

It may be assumed that the several dynamo-electric machines are stationary and that the controller 24 occupies its illustrated position. A circuit is completed which extends from the positive side of a battery 25, or other suitable source of energy, through conductor 26, controller 24, conductor 27, an overspeed device 28, push-button switch 29 and coil 30 of no-voltage relay 31 to the negative terminal of the battery 25. The relay 31 is accordingly closed to connect the positive terminal of the battery to a contact segment 33 of the controller 24.

When the controller is actuated to the right, as viewed in Fig. 2, to position $a$, it completes a circuit which extends from the controller 24, the contact segments of which are connected to the positive terminal of the battery, through conductor 34, coil 35 of relay 36 and transfer relay 37, which is in its lower position, to the negative side of the battery. The relay 36 thereupon closes to complete the circuits of the actuating coils of switches 17, 18 and 19. These circuits extend from the positive terminal of the battery through the several actuating coils of switches 17, 18 and 19, in parallel, and relay 36 to the negative terminal of the battery.

The switches 17, 18 and 19 accordingly close to connect the secondary winding of the motor 1 in circuit with the resistors 9. The closing of these switches effects the closing, also, of interlocks which are mechanically connected thereto and are electrically connected in series relation to each other to partially complete a circuit for the actuating coil 38 of reversing switch 7.

In the position $b$ of the controller, a circuit is completed which extends from the controller through conductor 39, coil 38 of reversing switch 7, interlock 40 connected to reversing switch 8 and interlocks connected to switches 19, 18, and 17 to the negative side of the battery. The switch 7 closes to complete the primary circuit of the motor 1.

An interlock 41, which is mechanically connected to the switch 7, completes a circuit for the coil 42 of relay 43 which extends from the positive terminal of the battery through coil 42, conductor 46, interlock 41 and interlocks connected to switches 19, 18 and 17 to the negative terminal of the battery. The relay 43 then closes if the current traversing a series coil 47 does not exceed a predetermined value.

In position $c$ of the controller, a circuit is completed which extends from the controller 24 through conductor 48, relay 43, interlock 49 of switch 16 and coil 50 of switch 11 to the negative terminal of the battery. The switch 11 then closes to complete a shunt circuit for a section of each of the resistors 9 and thereby accelerate the motor.

The closing of switch 11 permits the closing of an interlock 51 that is mechanically connected thereto to complete the circuit of the actuating coil of switch 12. The time of closing of the interlock 51 is determined by a series coil 10. The closing of switch 12 effects the closing of switch 13 in like manner, and the switches 14, 15 and 16 close automatically and in sequence to complete shunt circuits for the entire resistors 9 and thereby accelerate the motor 1 to substantially its normal speed.

The closing of switch 16 effects the opening of the interlock 49 connected thereto which controls the circuit of the coil 50 of switch 11 and the latter opens to effect the opening of switches 12, 13, 14 and 15. The switch 16 remains closed, however, because the interlock 49 closes a holding circuit for the actuating coil of switch 16. This circuit extends from the conductor 48, which is connected to the positive terminal of the battery, through relay 43, interlock 49 and actuating coil of switch 16, to the negative terminal of the battery.

When the switch is actuated to its final running position $f$, a circuit is completed which extends from the controller 24 through conductor 52, a switch 53 controlled by the movable arm of a rheostat 54, relay 55, which is mechanically connected to switch 16, and actuating coil 56 of transfer relay 37, to the negative side of the battery.

The transfer relay 37 is actuated to its upper position to open the circuit of the actuating coil 35 of relay 36. The relay 36 opens to break the circuits of the actuating coils of switches 17, 18 and 19, and the latter open the connections of the secondary winding of the motor 1 to the resistors 9. The opening of the interlocks of switches 17, 18 and 19 opens the circuit of coil 42, and the relay 43 opens. The opening of relay 43 breaks the circuit of the actuating coil of switch 16 and the latter switch opens.

The actuation of the relay 37 to its upper position effects the closing of a circuit which extends from conductor 52, which is connected to the positive terminal of the battery, through conductor 57, actuating coil 58 of relay 59, and transfer relay 37 to the negative terminal of the battery.

The closing of relay 59 connects the actuating coils of switches 21, 22 and 23 directly across the terminals of the battery and these switches close to connect the secondary winding of the motor 1 to the slip rings of the rotary converter 6. The secondary winding of the motor 1 is now short-circuited through the windings of the rotary converter and the direct-current motor 5. This change in connection has no effect, however, upon the speed of the system since the field magnets of the motor 5 are de-energized and the rotary converter supplies no energy to the direct-current motor 5. There is, consequently, no counter-electromotive force for opposing the electromotive force of the secondary winding of the main motor.

In case it is desired to reduce the speed of the system in order to adapt the same to the conditions governing the operation of the driven mechanism, the movable arm of the rheostat 54 which, in its illustrated position, shunts the field-magnet winding of the direct-current motor 5, is actuated in a counter-clockwise direction, as viewed in Fig. 2, to insert a gradually increasing amount of resistance in the shunt circuit controlled by it and to thus increase the field excitation of the direct-current motor. The excitation of the motor field causes a corresponding amount of energy to be supplied to the motor 5 from the brushes of the rotary converter.

A counter-electromotive force, which is now generated by the rotary converter, opposes the electromotive force of the secondary winding of the motor 1 and the effect is to decrease the speed of the motors. The speed of the motors may be varied from a maximum when the field of the direct-current-motor 5 is not excited and no energy is supplied to the latter by the secondary winding of the main motor 1, to a minimum when the field excitation of the direct-current motor 5 is a maximum and the greatest amount of energy is supplied to the latter through the medium of the rotary converter.

It will be noted that, in the operation of the controlling devices to connect the secondary winding of the motor to the slip rings of the rotary converter, the change in connections can be effected only when the relay 55 is in its closed position. By reason of its lost-motion connection to the switch 16, the relay 55 is closed only when the current traversing the secondary circuit of the motor, which includes the coil 60 of the relay 55, is below a predetermined value. It will be noted, further, that the switch 53, which is controlled by the movable arm of the rheostat 54 and is in circuit with the actuating coil 56 of relay 37, insures that the field of the direct-current motor 5 is not excited when the connections are transferred in the manner described above.

To bring the mechanism to rest, the controller is actuated toward its "off" position. The switches 21, 22 and 23 are retained in their closed positions by the relay 59 until the controller 24 reaches its "off" position. A holding circuit for the transfer relay 37, which controls the circuit of the coil 58 of relay 59, extends from conductor 34 through the interlocks of switches 21, 22 and 23 and coil 56 to the negative terminal of the battery. The connections of conductor 34 are broken only when the controller is in its "off" position.

The primary circuit is opened at switch 7 when the controller is actuated to position $a$ to open the circuit of coil 38. When the controller occupies its "off" position, the circuit of coil 56 of transfer relay 37 is open and the latter breaks the circuit of coil 58. The relay 59 opens to break the circuits of the actuating coils of switches 21, 22 and 23. The latter switches then open the secondary circuits of the motor 1.

The controlling mechanism thus operates to open the circuit of the primary winding before the secondary circuit is opened. The circuits of the motor 1 are opened in this order for the reason that considerable energy is stored in the primary member of an alternating-current motor. This energy must be dissipated upon the opening of the circuits of its windings. If the opening of the secondary circuit is arranged to occur subsequently to the opening of the primary circuit, the energy stored in the primary member of the motor may be dissipated without danger of destroying the insulation of the motor.

The system may be brought to rest immediately in case of emergency by opening the push-button switch 29 and thereby de-energizing the coil 30 of no-voltage relay 31. The latter controls the connection of the battery to the controller and, through the latter, to the various control circuits.

The circuit breakers for controlling the primary circuits of the alternating-current motor and the circuit of the direct-current motor are so arranged and interlocked that they must be closed in proper order. A switch 62, which is mechanically connected to a circuit breaker 63 for controlling the circuit of the direct-current motor 5, controls the circuit of the actuating coil 30 of no-voltage relay 31. The latter relay controls the circuits of the actuating coils of the line switches for the alternating-current motor. Accordingly, it is necessary that the direct-current circuit breaker be closed before it is possible to effect the closing of the primary circuit of the alternating-current motor 1.

A circuit breaker 64, which controls the primary circuit of the alternating-current motor 1, is provided with a series tripping coil 65 in order that the circuit breaker may be opened in case of an overload upon the motor. A switch 66, which is mechanically connected to the circuit breaker 64, and opened and closed simultaneously therewith, is located in the control circuit in such manner that its opening effects the de-energization of the entire control circuit. It will be apparent, therefore, that the opening of the primary circuit of the main motor 1 effects the opening of all of the switches that may be closed at that time and effects, also, the de-energization of the tripping coil 67 of the circuit breaker 63.

The above arrangement is necessary for the reason that, if the direct-current circuit breaker opens because of overload conditions, the speed of the rotary converter increases while the alternating-current motor comes to rest quickly. Under these conditions, the rotary converter is supplied with current at line frequency and is, accordingly, driven at a dangerous speed. For the above reasons, it is highly desirable to effect the opening of the primary circuit of the alternating-current motor upon the opening of the direct-current circuit breaker.

It is also desirable to effect the opening of the direct-current circuit breaker upon the opening of the alternating-current circuit breaker upon the occurrence of overload conditions. The rotary converter may, otherwise, be damaged by the excessive currents traversing its circuit by reason of the high inertia of the rotating parts.

By means of the system above described, the speed of an alternating-current motor may be controlled within desired limits and the operation of the various elements and controlling devices of the system is effected by means of a single manually operable controller. The system operates efficiently at various speeds and under varying loads since the energy, ordinarily dissipated in the form of heat by means of rheostats or liquid resistors, is returned to the system by means of the rotary converter and direct-current motor. Protective devices are employed which ensure that the entire system shall be rendered inoperative upon the occurrence of abnormal conditions in the circuits of any of the translating devices.

I claim as my invention:

1. In an electrical system, the combination with a direct-current electric motor, an alternating-current motor mechanically connected thereto and a rotary converter electrically connected to said direct-current motor, of means for successively effecting the acceleration of said alternating-current motor and the connection of its secondary winding to said rotary converter, and means for preventing the connection of said windings when the field of said motor is excited.

2. In an electrical system, the combination with a direct-current electric motor, an alternating-current motor mechanically connected thereto and a rotary converter electrically connected to said direct-current motor, of means for successively effecting the acceleration of said alternating-current motor and the connection of its secondary winding to said rotary converter, and means for preventing the connection of said windings when the field of said motor is excited, said preventing means comprising a device for controlling the excitation of the motor field and a switch controlled by said device.

3. In an electrical system, the combination with a direct-current, electric motor, an alternating-current motor mechanically connected thereto and a rotary converter electrically connected to said direct-current motor, of means for successively effecting the acceleration of said alternating-current motor and the connection of its secondary winding to said rotary converter, and means for preventing the connection of said windings when the field of said motor is excited, said preventing means comprising a rheostat and an electromagnetic switch having a coil, the circuit of which is controlled by the movable member of said rheostat.

4. In an electrical system, the combination with a direct-current electric motor, an alternating-current motor mechanically connected thereto and a rotary converter electrically connected to said direct-current motor, of means comprising a master switch for successively affecting the acceleration of said alternating-current motor and the connection of its secondary winding to said rotary converter, and means comprising a field rheostat and a switch interlocked therewith for preventing the connection of said windings when the field of said motor is excited.

5. In an electrical system, the combination with an alternating-current motor having a primary winding and a secondary winding, of controlling means therefor comprising a master switch that is operable to successive positions for respectively closing the circuits of said secondary winding and said primary winding and operable in the reverse direction for successively opening said circuits in the reverse order.

6. In an electrical system, the combination with an alternating-current having a primary and a secondary winding, of controlling means therefor comprising a plurality of electromagnetic switches in circuit therewith and a master switch that is operative to successive positions for effecting the closing of the switches in the secondary circuits and in the primary circuits, respectively, and is operable in the reverse direction for securing the opening of the switches in inverse order.

In testimony whereof I have hereunto subscribed my name this 29th day of May, 1917.

GEORGE W. HUEY.